US008354075B1

(12) United States Patent
Tai et al.

(10) Patent No.: US 8,354,075 B1

(45) Date of Patent: Jan. 15, 2013

(54) STREAMLINE-BASED MICROFLUIDIC DEVICE

(75) Inventors: Yu-Chong Tai, Pasadena, CA (US); Siyang Zheng, Pasadena, CA (US); Harvey Kasdan, Sherman Oaks, CA (US)

(73) Assignees: California Institute of Technology, Pasadena, CA (US); IRIS International, Inc., Chatsworth, CA (US)

( * ) Notice: Subject to any disclaimer, the term of this patent is extended or adjusted under 35 U.S.C. 154(b) by 481 days.

(21) Appl. No.: 11/408,514

(22) Filed: Apr. 20, 2006

Related U.S. Application Data

(60) Provisional application No. 60/673,572, filed on Apr. 21, 2005.

(51) Int. Cl.
*B01L 3/00* (2006.01)
*G01N 1/00* (2006.01)

(52) U.S. Cl. ........ 422/503; 422/500; 422/501; 422/502; 422/504; 422/505; 436/180

(58) Field of Classification Search ............ 422/99–104, 422/500–505; 436/180
See application file for complete search history.

(56) References Cited

U.S. PATENT DOCUMENTS

| | | | | |
|---|---|---|---|---|
| 5,091,328 | A | 2/1992 | Miller | |
| 6,592,821 | B1 * | 7/2003 | Wada et al. | 422/68.1 |
| 6,632,619 | B1 * | 10/2003 | Harrison et al. | 435/7.2 |
| 2002/0041827 | A1 * | 4/2002 | Yager et al. | 422/57 |
| 2003/0159999 | A1 * | 8/2003 | Oakey et al. | 210/695 |
| 2004/0166025 | A1 * | 8/2004 | Chan et al. | 422/99 |

OTHER PUBLICATIONS

Ayón, A.A. et al., "Characterization of a Time Multiplexed Inductively Coupled Plasma Etcher," *Journal of the Electrochemical Society*, 1999, vol. 146, No. 1, pp. 339-349.

Huang, L.R. et al., "Continuous Particle Separation Through Deterministic Lateral Displacement," *Science*, May 14, 2004, vol. 304, pp. 987-990.

Yamada, M. et al., "Pinched Flow Fractionation: Continuous Size Separation of Particles Utilizing a Laminar Flow Profile in a Pinched Microchannel," *Analytical Chemistry*, Sep. 15, 2004, vol. 76, No. 18, pp. 5465-5471.

Yamada, M. et al., "Hydrodynamic Filtration for On-Chip Particle Concentration and Classification Utilizing Microfluidics," *Lab on a Chip*, 2005, vol. 5, pp. 1233-1239.

Zheng, S. et al., "Deterministic Lateral Displacement MEMS Device for Continuous Blood Cell Separation," Eighteenth IEEE International Conference on Micro Electro Mechanical Systems (MEMS '05): Miami, USA, Jan. 30-Feb. 2, 2005, pp. 851-854.

* cited by examiner

*Primary Examiner* — Dean Kwak

(74) *Attorney, Agent, or Firm* — Kilpatrick Townsend & Stockton LLP.

(57) ABSTRACT

The present invention provides a streamline-based device and a method for using the device for continuous separation of particles including cells in biological fluids. The device includes a main microchannel and an array of side microchannels disposed on a substrate. The main microchannel has a plurality of stagnation points with a predetermined geometric design, for example, each of the stagnation points has a predetermined distance from the upstream edge of each of the side microchannels. The particles are separated and collected in the side microchannels.

12 Claims, 10 Drawing Sheets

STREAMLINE-BASED MICROFLUIDIC DEVICE

CROSS-REFERENCES TO RELATED APPLICATIONS

This application claims priority to U.S. Provisional Patent Application No. 60/673,572, filed Apr. 21, 2005, which is hereby incorporated by reference in its entirety for all purposes.

STATEMENT AS TO RIGHTS TO INVENTIONS MADE UNDER FEDERALLY SPONSORED RESEARCH OR DEVELOPMENT

A portion of the present invention was made under federally sponsored research and development under NASA through the National Space Biomedical Research Institute (NSBRI). The co-operative agreement number is NCC 9-58-317. The Government may have rights in certain aspects of this invention.

BACKGROUND OF THE INVENTION

Separation of particles based on size is one of the essential components in biochemical analysis, environmental assays, and industrial and biomedical applications. Filtration is one of the most frequently used techniques to separate particles. A mechanical filter can be used to remove, filter, or collect particles. This filtering and collection of particles can be used for sampling of particles, chemical detection, and/or biological cell analysis.

Existing filtration methods are performed in a batch or a continuous manner. However, when the particle size is much smaller or when the difference in particle size is smaller, separation becomes difficult. Pore clogging or membrane fouling may be an issue.

Separation of specific cells from a mixed cell population is important in medicine for biological and immunological measurements, and for use in cell therapy (e.g. transfusion medicine). For example, in the medical field, it is often necessary to filter blood. Human blood cell separation is the first challenging step towards total blood count and the subsequent disease diagnosis, prognosis and management. Normal erythrocytes vary in dimension from 5 μm to 8 μm. Leukocytes have an average diameter of between 7 μm to 20 μm.

Several techniques are available for separation of blood elements. Most current approaches involve centrifugation (e.g. distinguishing the cells based on density) or surface characteristics. Such procedures are typically not able to separate all of the white blood cells from the platelets and the forces involved in separation of the cells can damage the final product. Cell labeling-based separation techniques are expensive, inconvenient and in most cases, labeled cells cannot be infused in patients and the harsh washing conditions necessary to remove the label can damage the cells. Passive matrix-based separation techniques are not sufficiently selective or adaptive for separation of specific cell types. Similarly, column chromatography and magnetic bead adsorption techniques cannot separate cell subtypes quickly and cheaply.

Therefore, there is a need to develop devices and methods for continuous separation of particles of different sizes, in particular, the separation of various cells and particles that exist in blood. The present invention satisfies these and other needs.

BRIEF SUMMARY OF THE INVENTION

The present invention provides a streamline-based microfluidic device and a method of using the device for continuous separation of particles and cells.

According to the present invention, a microfluidic device is provided, which includes components linked in fluid communication. The components include one or more sample inlet ports, one or more microchannels, and one or more outlet ports. The device is capable of sorting particles (such as cells) according to their characteristics, such as particle size and shape. The various components are compatible with various microscale systems. Moreover, the design is modular, which permits the addition of other elements (e.g. detectors, cell collection chambers, and the like.)

According to one aspect of the present invention, a microfluidic device for streamline separation of particles is provided. The device includes one or more inlets, one or more outlets, a main microchannel and a plurality of side microchannels. The microchannels are disposed on a substrate. The main channel and the side channels are in fluid communication. The main channel contains a plurality of geometric stagnation points, one or more inlets and one or more outlets. In one embodiment, each stagnation point has a predetermined geometric design, for example, each of the stagnation points has a predetermined distance from the edge of each of the side microchannels. In another embodiment, one or more of the side microchannels are substantially perpendicular to the main microchannel.

According to another aspect of the present invention, a method for streamline separation of particles using the microfluidic device of the present invention is provided. The method includes administering a fluid containing a plurality of particles through the main microchannel, optionally applying a positive or a negative pressure to the main microchannel to separate each particle, and collecting the plurality of particles from each of the side microchannels. In one embodiment, the particles to be separated include red blood cells and white blood cells.

Reference to the remaining portions of the specification, including the drawings and claims, will realize other features and advantages of the present invention. Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE DRAWINGS

FIG. 4B is an enlarged view of a portion of FIG. 4A.

DETAILED DESCRIPTION OF THE INVENTION

The present invention provides a novel streamline-based microfluidic device and a method of using such a device for continuous separation of particles of various sizes. The device is especially useful for the separation of erythrocytes from leukocytes in the blood. In certain instances, the present invention provides a system, which does not require moving parts, and thus it is desirable for integration with other kinds of micro unit operation for other treatment, analysis and utilization. The present invention demonstrates a high separation efficiency, an ease of operation, capability of simultaneous particle concentration and size dependent separation and elimination of channel clogging. Advantageously, the microfluidic device can have a tailored design with a tunable capability to allow easy and accurate manipulation of particles of various sizes found in biological, ecological and industrial environments, especially in the separation of particles and cells in the blood to obtain accurate blood counts for diagnosis and treatment.

As used herein, the term "microchannel" or "channel" refers to a micrometer dimension pathway through a medium that allows for movement of liquids and gases. Channels can connect with other components in fluid communication.

As used herein, the term "streamline" refers to the path of a particle that is flowing steadily and without turbulence in a fluid past an object, or the flow of a fluid past an object such that the velocity at any fixed point in the fluid is constant or varies in a regular manner. For example, streamline flow means a flow of a gas or liquid in which the velocity at any point is relatively steady.

As used herein, the term "stagnation point" refers to a point in a flow where the velocity is zero, where any streamline touches a solid surface at an angle.

As used herein, the term "edge distance of side channel" refers to the height between the downstream edge and the upstream edge of each of the side microchannels.

As used herein, the term "particle(s)" refers to particles found, for example, in vitro or in vivo including, but not limiting to, aersols, cells, bacteria, microorganisms, fiberins and particulates.

Figures 4, 4A, 4B:
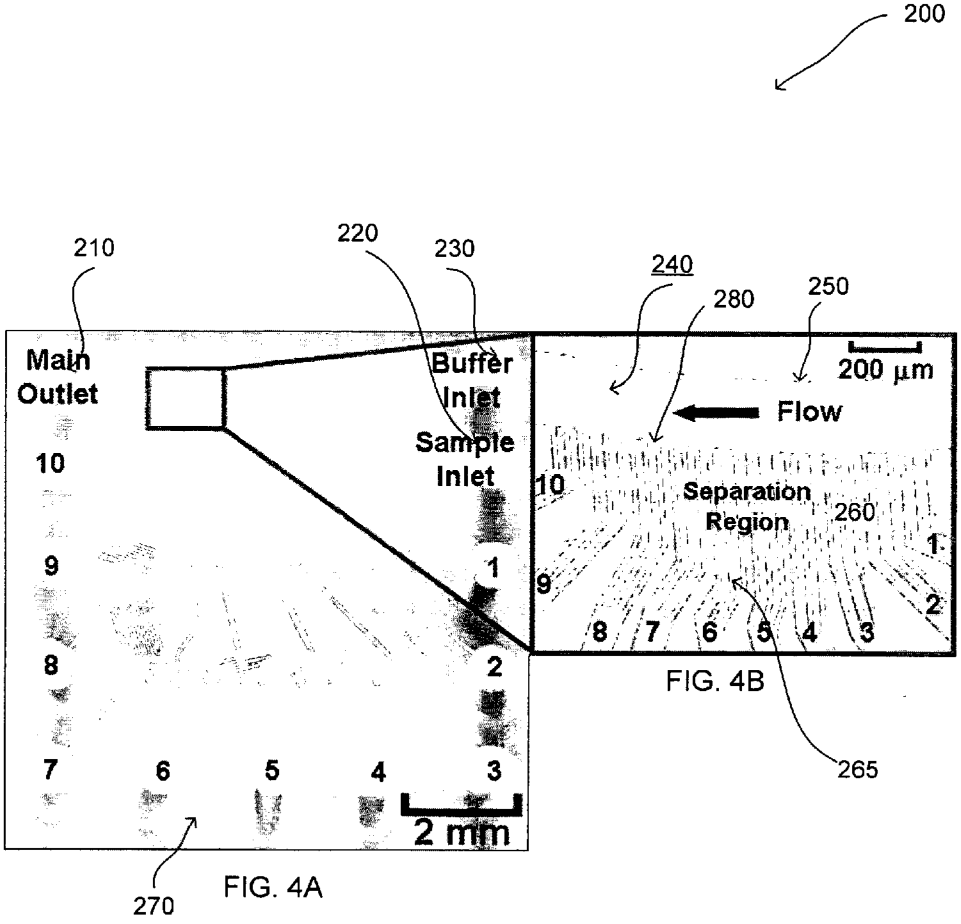
FIGS. 4A-B are schematic device layouts illustrating embodiments of the present invention utilizing streamline-based design. Side microchannels are divided into ten groups and are numbered from 1 to 10.

As used herein, the term "side channel length" or "side microchannel length" refers to the length of the side microchannels as shown in FIG. 4. "Side channel length" or "side microchannel length" is represented by letter L as shown in Table 1.

Figure 1:
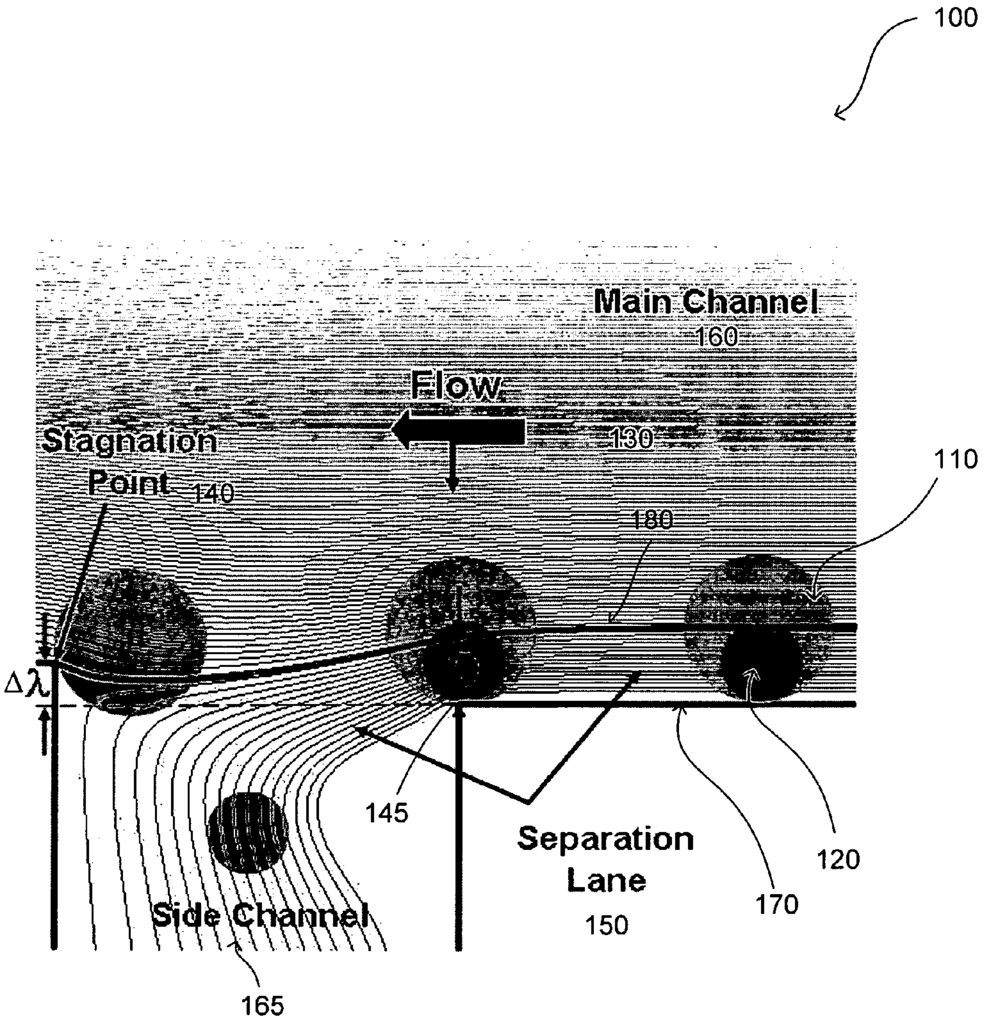
FIG. 1 is a schematic showing the structure and operation of one embodiment of the present invention.

FIG. 1 is a schematic illustration of one embodiment of a device of the present invention and illustrates its principle of operation. The present invention is not limited to what is shown in FIG. 1. As shown therein, the device 100 has a main microchannel 160 channel and a side microchannel 165. The side microchannel 165 is in fluid communication with the main microchannel 160. The main microchannel 160 has a stagnation point 140 and a separation lane 150. The separation lane 150 is defined by the channel wall 170 and a streamline 180 ended at the stagnation point 140, i.e., the downstream edge of the side channel 165. Letter D denotes the minimal width of the separation lane 150. The stagnation point 140 in the present invention has a predetermined geometric design including a size, shape and distance, for example, a predetermined distance $\Delta\lambda$ from the upstream edge 145 of the side microchannel 165. $\Delta\lambda$ is also referred to as a side channel edge distance (see, FIG. 2). The fluid 130 flows in the direction shown. For low Reynolds number laminar flow, the center of particles follow streamlines if there are no interactions between the particles and a channel wall. Particles with radiuses smaller than the minimal width of the separation lane D exit from the side microchannel, while larger particles are displaced by the main microchannel wall so much that they continue to flow along it. For example, particle 120 having a radius smaller than D exits from the side channel 165. Particle 110 having a radius greater than D continues to flow along the main microchannel 160. The device is designed such that the diameter of the main microchannel is larger than the dimension of the largest particle to be separated.

Figure 2:
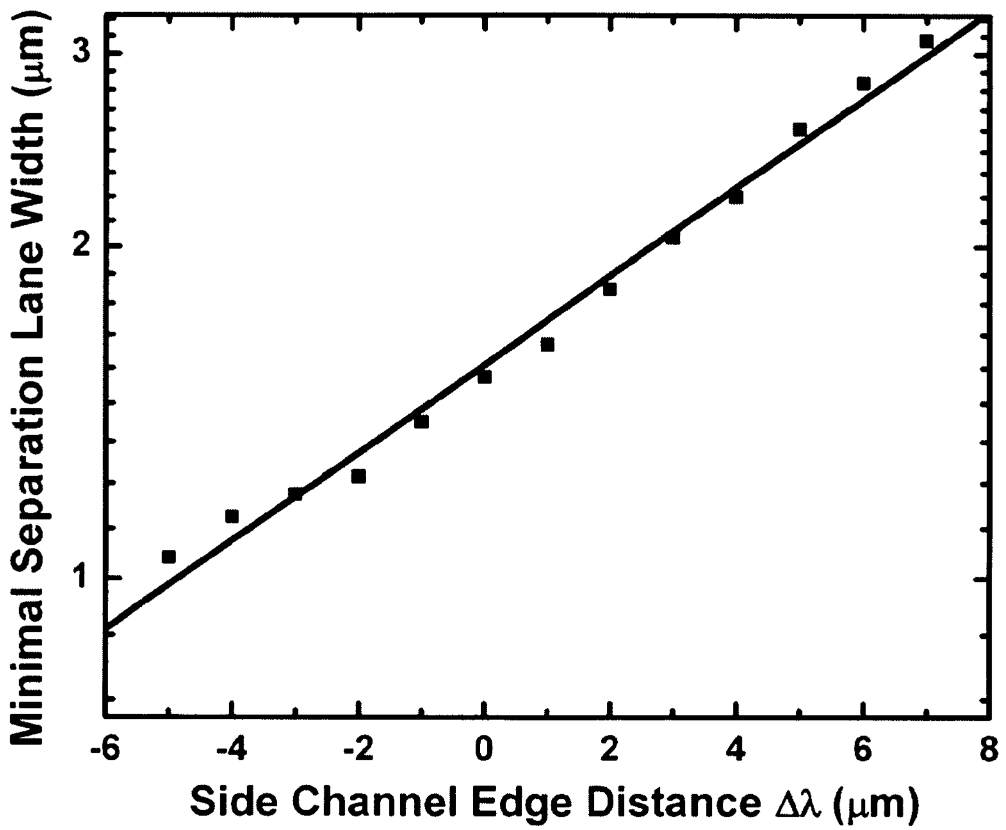
FIG. 2 illustrates the effect of a side channel edge distance on minimal separation lane width.
Figure 3:
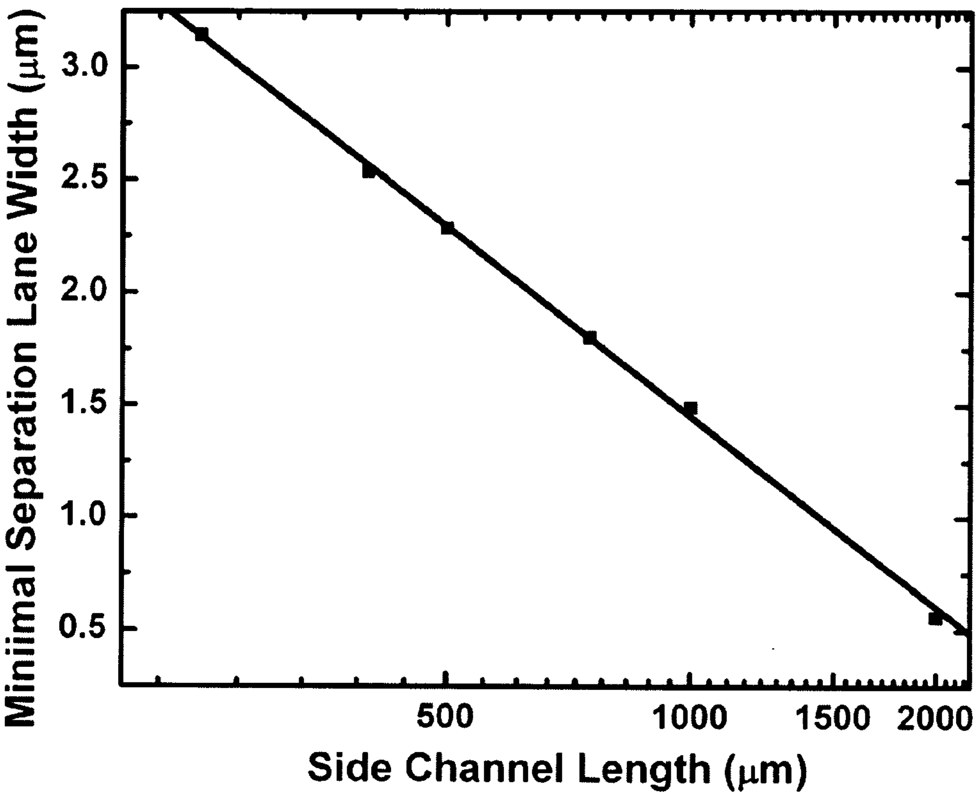
FIG. 3 illustrates the effect of a side channel length on minimal separation lane width.

Simulation results have shown that that the minimal separation lane width D is a function of both the side channel edge distance $\Delta\lambda$ and the side microchannel length L (FIGS. 2 and 3). FIG. 2 illustrates the effect of side channel distance on minimal separation lane width. As the side channel edge distance increases, the minimal separation lane width increases in a proportional manner. The side channel edge distance can vary from 0 μm to 10 μm. The minimal separation lane width D can vary from about 1 μm to about 500 μm. Thus, the separation lane width can be precisely controlled by adjusting the side channel edge distance. In one embodiment, the side channel edge distance is an integer from 0 μm to 9 μm. FIG. 3 illustrates the effect of side channel length L on the minimal separation lane width D. As the side channel length increases, the minimal separation lane width decreases proportionally. In one embodiment, the device uses a shorter side microchannel for the separation of larger particles. The side microchannel length can vary from about 100 μm to about 25000 μm, preferably from 2000 μm to 22000 μm. The main channel can have a length from about 1000 μm to about 5000 μm, 2000 μm to 7000 μm, 5000 μm to 10000 μm, 8000 um to 12000 μm, 10000 μm to 15000 μm, 14000 to 20000 μm, 18000 μm to 22000 μm or 20000 μm to 25000 μm.

According to one aspect of the present invention, the separation lane width D can be controlled by the local geometry of the separation region and the flow resistance of the side microchannels. Table 1 shows the results of simulation software (FEMLAB) using the Navier Stokes equation.

TABLE 1

Prediction of minimal separation lane width by simulation of 2D in compressible Navier-Stokes equation with FEMLAB

| Side Channel Group Number | 1 | 2 | 3 | 4 | 5 | 6 | 7 | 8 | 9 | 10 |
|---|---|---|---|---|---|---|---|---|---|---|
| Side Channel Length L (μm) | 22000 | 19800 | 17600 | 15400 | 13200 | 11000 | 8800 | 6600 | 4400 | 2200 |

TABLE 1-continued

| Prediction of minimal separation lane width by simulation of 2D in compressible Navier-Stokes equation with FEMLAB | | | | | | | | | | |
|---|---|---|---|---|---|---|---|---|---|---|
| Side Channel Group Number | 1 | 2 | 3 | 4 | 5 | 6 | 7 | 8 | 9 | 10 |
| Edge Distance Δλ (μm) | 0 | 1 | 2 | 3 | 4 | 5 | 6 | 7 | 8 | 9 |
| Minimal Separation Lane Width D (μm) | 2.28 | 2.57 | 2.88 | 3.08 | 3.54 | 4.12 | 4.79 | 5.76 | 7.39 | 10.75 |

In certain aspect, the present invention provides a device with tailored designs, where the separation lane width and selection of side microchannels can be precisely controlled through the geometric design of the stagnation points and the variation of the side channel lengths. The device with such designs enables accurate and efficient separation of particles having various dimensions.

FIG. 4 illustrates one aspect of the present invention. As shown in FIGS. 4A-B, the device 200 has a substrate 270, a main microchannel 250 and a separation region 260 (FIG. 4B) comprising one or more side microchannels grouped and numbered 1-10. A representative side microchannel 265 is shown. The device optionally contains a fluid 240. The main microchannel 250 is in fluid communication with the side microchannels. The main microchannel 250 has a plurality of stagnation points. A representative stagnation point 280 is shown. Each of the stagnation points is formed by the downstream edge of each of the side microchannels. The main microchannel 250 also has a sample inlet 220, a buffer inlet 230 and a main outlet 210. In certain embodiments, the main microchannel 250 and at least one side microchannel are substantially perpendicular to each another.

Many materials can be used as substrates for the construction of the microfluidic device. The materials include, but are not limited to, polysiloxane, paraylene, glass, silicon, polyacrylate, polyethylene, polypropylene, polystyrene, polycarbonate and the like. Preferably, polydimethysiloxane (PDMS) is used as a substrate for the fabrication of the device. PDMS is a preferred substrate material because of its optical transparency, ease of molding, elastomer character, controlled surface chemistry of oxidized PDMS using conventional siloxane chemistry; and compatibility with cell culture (e.g. non-toxic and gas permeable). Soft lithographic rapid prototyping can be employed to fabricate the desired microfluidic microchannel systems. Soft lithography is an alternative to silicon-based micromachining that uses replica molding of nontraditional elastomeric materials to fabricate microfluidic channels. The softness of the materials used allows the device areas to be reduced by more than two orders of magnitude compared with silicon-based device. The devices can be fabricated with deep reactive ion etching (DRIE) of silicon molds. An example of DRIE of single crystal silicon has been demonstrated by the BOSCH process, See, Ayon, A. A., and et al "Characterization of a time multiplexed inductively coupled plasma etcher," *J. Electrochem. Soc.,* 1999, 146, 339-349 incorporated herein by reference.

In other embodiments, the present invention contemplates fabricating devices using glass or silicon substrates. Silicon has well-known fabrication characteristics and associated photographic reproduction techniques. The principal modern method for fabricating semiconductor integrated circuits is the so-called planar process. The planar process relies on the unique characteristics of silicon and comprises a sequence of manufacturing steps involving deposition, oxidation, photolithography, diffusion and/or ion implantation, and metallization, to fabricate a "layered" integrated circuit device in a silicon substrate, see, e.g., U.S. Pat. No. 5,091,328, hereby incorporated by reference.

A skilled artisan will appreciate that the present invention is not limited to the arrangements of the microchannels shown in FIG. 4. In some embodiments, the main microchannel is substantially perpendicular to at least one side microchannel. In certain embodiments, the main microchannel and the side microchannels can be in a relationship such that they form an angle between approximately 170 degrees and approximately 45 degrees, and more preferably between approximately 120 degrees and approximately 80 degrees. Further, the main microchannel and side microchannels need not be in a perfect x-axis/y-axis/z-axis alignment. In one embodiment, the main microchannel and side microchannels are coplanar. In another embodiment, the side microchannels are substantially parallel to each another. In yet another embodiment, each of the side microchannels forms an angle between approximately 0.5 degree to approximately 80 degrees with respect to one another. In fact, in certain embodiments, a z-axis can yield additional side microchannels.

The main microchannel and the side microchannels can have a variety of shapes. The cross-section geometries of the microchannels include, but are not limited to, a circle, an oval, a symmetric polygon and an unsymmetric polygon. The shapes and the sizes of the cross-section can vary along the microchannels. In one embodiment, the number of sides of the polygonal cross-section can vary from 3 to about 29. One example is a four-sided polygon such as a square or rectangle. Each of the side microchannels can have the same or different dimensions. Depending on the types, numbers and density of the particles to be separated, a device can have any desirable numbers of side microchannels to meet the operation requirements, for example, from 1 to 10,000; from 1 to 1,000; or from 1 to 100.

The present invention is not limited by precise dimensions of the microchannels employed in the separating devices. Illustrative ranges for microchannels are as follows: the microchannels can be between 0.35 μm and 200 μm in depth (preferably 20 μm) and between 2 μm and 1000 μm in width (preferably between 10 μm and 500 μm). The microchannels can be fabricated into any desirable length and width. The main channel can have a length from about 100 μm to about 500 μm, 200 μm to 700 μm, 500 μm to 1000 μm, 800 um to 1200 μm, 1000 μm to 1500 μm, or 1400 um to 2000 μm, (preferably 1,000 μm). The side microchannels can be evenly or unevenly spaced. In one embodiment, the side microchannels are evenly spaced. The distance between the adjacent side microchannels can be in the range of 1 μm to 5 μm, 2 μm to 6 μm, 5 μm to 10 μm, 8 μm to 12 μm, 10 μm to 15 μm, 15 μm to 20 μm or 18 μm to 25 μm, preferably between about 5 μm and about 25 μm, such as 5, 6, 7, 8, 9, 10, 11, 12, 13, 14, 15, 16, 17, 18, 19, 20, 21, 22, 23, 24, or 25 μm. In one embodiment, the device has a plurality of evenly spaced microchannels. In another embodiment, the distance between each of the adjacent microchannels is 20 μm. It is specifically contemplated that the present invention can employ both channels of uniform dimensions, and channels of different dimensions. For example, the present invention contemplates channels that are uniform and channels that are non-uniform. With regard to the latter, the beginning of the channel may be wider (e.g. have a greater radius) than the middle or end of the channel. In one embodiment, a "v" design is employed, whereby a channel gradually narrows (e.g. the radius gradually decreases) from the beginning to the end, along the length of the channel. In other aspects, the present invention also contemplates side microchannels wherein the channel gradually widens (e.g. the radius of the channel gradually increases) from the beginning of the channel to the end of the channel.

While FIG. 4 shows smooth channel walls, however, a skilled artisan will appreciate that the present invention is not limited to linear or smooth channel walls. In one aspect, the main microchannels can have an upper wall and a lower wall having the same or different patterns. In some embodiments, the upper and/or lower wall of the channels has a wave (sinusoidal) pattern and the wave length is uniform. In certain other embodiments, the upper and/or lower wall of the channels has a wave pattern and the wave length is non-uniform. In another aspect, the side microchannels can have a left wall and a right wall having the same or different patterns. In some embodiments, the left and/or right wall of the channels has a wave (sinusoidal) pattern and the wave length is uniform. In certain other embodiments, the left and/or right wall of the channels has a wave pattern and the wave length is non-uniform.

The fluid used for separation can be, for example, a gas or a liquid. Suitable liquids include, but are not limited to, water and organic solvents. Suitable organic solvents include, but are not limited to, polar solvents, such as an alcohol, a ketone, an amide, such as dimethylormamide and dimethylacetamide; dimethysulfoxide, tetrahydrofuran, an ether and a chlorinated hydrocarbon solvent, such as chloroform, dichloromethane, dichloroethane, carbon tetrachloride, tetrachloroethylene and chlorobenzene; less polar solvents, such as an aromatic solvent, for example, benzene, toluene, xylene or an hydrocarbon solvent, for example, $C_4$-$C_8$ alkanes, such as butanes, pentanes, hexanes, heptanes and octanes; and combinations thereof. Suitable gases include, but are not limited to, air, CO, $CO_2$, $H_2$, $N_2$, $O_2$, methane, ethane, propane and a noble gas. The particles to be separated include, but are not limited to, beads, aerosols, cells, bacteria, fibrins and particulates present in a biological environment.

The stagnation points disposed within the main microchannel can be formed by, for example, the downstream edge of each side microchannels. The downstream edge can be either above or below the upstream edge. The stagnation points have a geometric design including a size, a shape and a distance. In one embodiment, the stagnation point is a sharp edge, corner, tip or point with a diameter from about 1 nm to about 1 μm. Alternatively, the stagnation points can be a smooth, or a rough surface and the surface can be either concave or convex. In another embodiment, the stagnation point can be modified with a layer of material other than the substrate material. For example, the stagnation point can be modified by depositing a layer of polymer, glass, ceramic material or metal. Suitable polymers for coating include, but are not limited to, polyester, polyacrylate, polyimide, parylene and polycarbonate. Suitable metals for coating include, but are not limited to, Au, Pt, Ag, Pd, Cu, Ir, Zn, Ni, Fe, Ru, Rh and Si. The distance between the upstream edge and the downstream edge can vary from about 0 μm to about 100 μm, preferably, from 0 μm to about 20 μm. The upstream edge can obtrude or withdraw from the downstream edge. In one embodiment, the upstream edge obtrudes, such as from the downstream edge. Alternatively, the upstream edge withdraws from the downstream edge.

Turning back to FIG. 4, in operation, the device has at least one sample inlet 220, a buffer inlet 230 and a main outlet 210. Alternatively, the device can have no buffer inlet, but has a sample inlet and a main outlet. The inlets and outlets can have various shapes and sizes to adapt for the proper function of the device. A liquid or a gas mixture is introduced into the device via the sample inlet port 220 such that a stream of liquid is created in the main channel 250. A buffer can be introduced into the device via buffer inlet port 230. The particle flow is first pinched or pushed against the main microchannel 250 wall by the buffer flow. Next, it enters into the separation region 260 with an array of side channels.

Optionally, pressure can be applied to the fluid or the microchannels. A pressure generating means can include, but is not limited to, a pump such as, a syringe pump, a peristaltic pump, an electrokinetic pump, a bubble pump, air pressure driven pump and a gravity driven pump. In one embodiment, the pressure applied to the fluid is generated by gravity. In another embodiment, the pressure applied to the fluid is generated by an electrokinetic means, for example, electroosmosis means, or a ratchet pump. In yet another embodiment, fluid pressure is generated using pneumatic or magneto hydrodynamic pumps. In still another embodiment, the pressure applied to the fluid is generated by a mechanical device. One example of a mechanical pressure generating device is a screw-type pumping device or a peristaltic pump.

The side microchannels can also be arranged into groups to facilitate the separation and collection. In certain aspects, each group can have, for example, from 2 to 20 side microchannels or more. The side microchannels in each group can have the same or different designs including variation in sizes and/or shapes. In one embodiment, each group contains microchannels of substantially the same dimensions and shapes. For example, each of the side microchannels in the group can be substantially parallel to one another.

Figure 5:
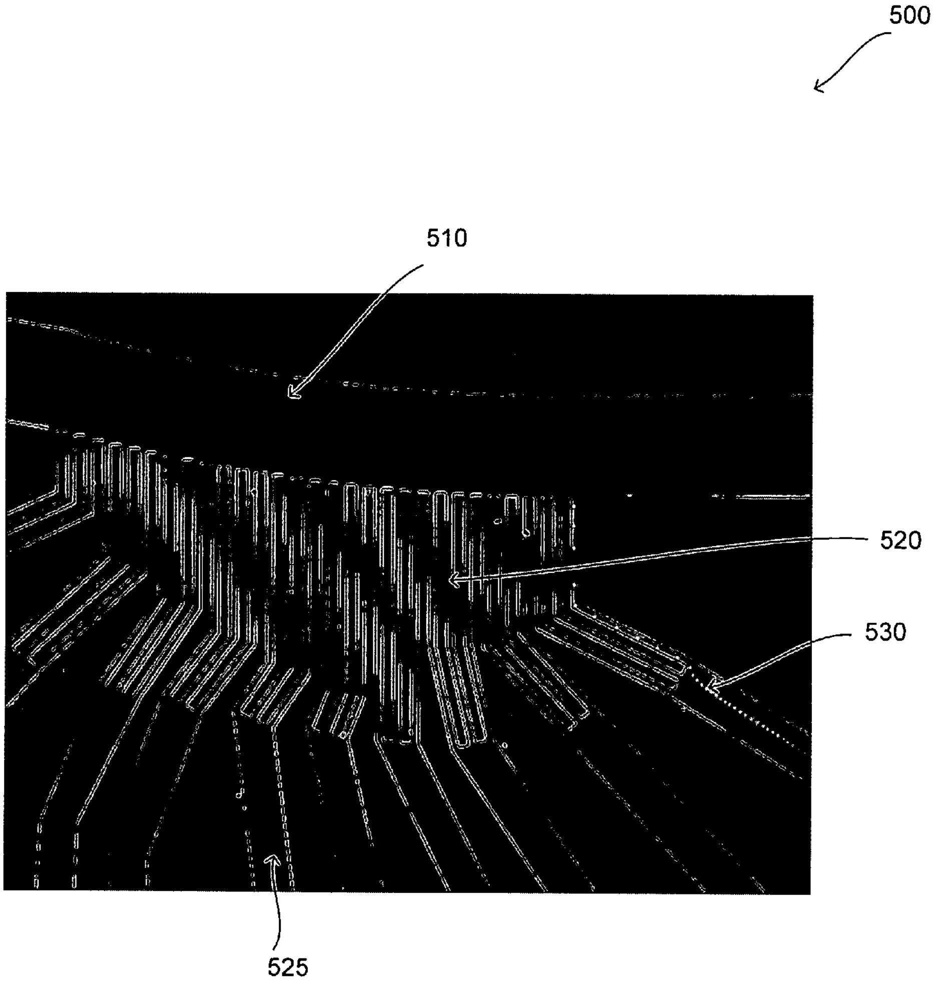
FIG. 5 illustrates the separation of 5 μm fluorescent polystyrene beads using an embodiment of the present invention.
Figure 6:
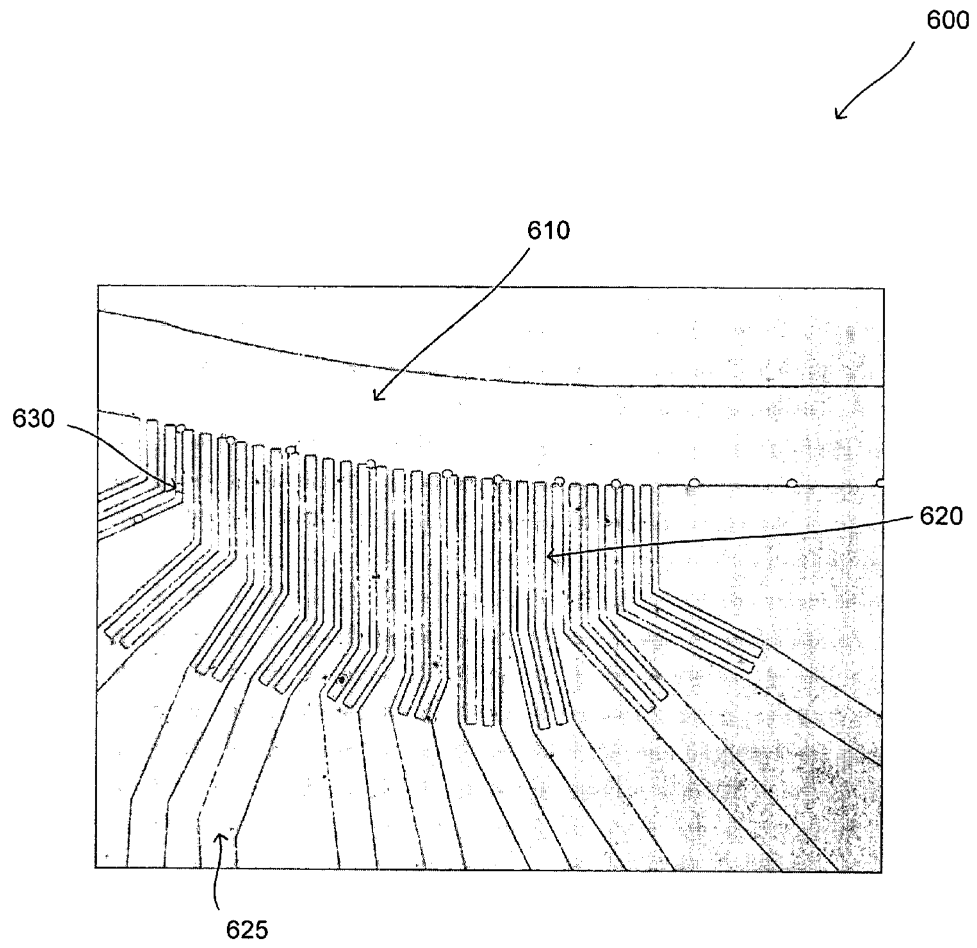
FIG. 6 illustrates the separation of 10 μm fluorescent polystyrene beads using an embodiment of the present invention.

FIGS. 5 and 6 are images of separation of polystyrene beads using an embodiment of the present invention. Turning first to FIG. 5, image 500 illustrates a device having a main microchannel 510 and a number of side microchannels. A representative side microchannel 520 is shown. The side microchannels are further divided into groups. Each group has three side microchannels of similar design. A representative group channel 525 is also shown. Other grouping designs are within the scope of this invention. The device is designed such that the particles of smaller diameters exit earlier. For example, 5 μm polystyrene beads 530 can be separated and exit from the first group side channels, whereas larger beads will exit later. Next, FIG. 6 illustrates image 600, a device having a main microchannel 610 and a number of side microchannels. A representative side microchannel 620 is shown. The side microchannels are further divided into groups. Each group has three side microchannels of similar design. A representative group channel 625 is also shown. Other grouping designs are also within the scope of the present invention. The device is designed such that the particles of larger diameters exit later. For example, 10 μm polystyrene beads 630 travel along the main microchannel and exit at a later group channel, whereas beads of smaller size exit earlier.

Figure 7:
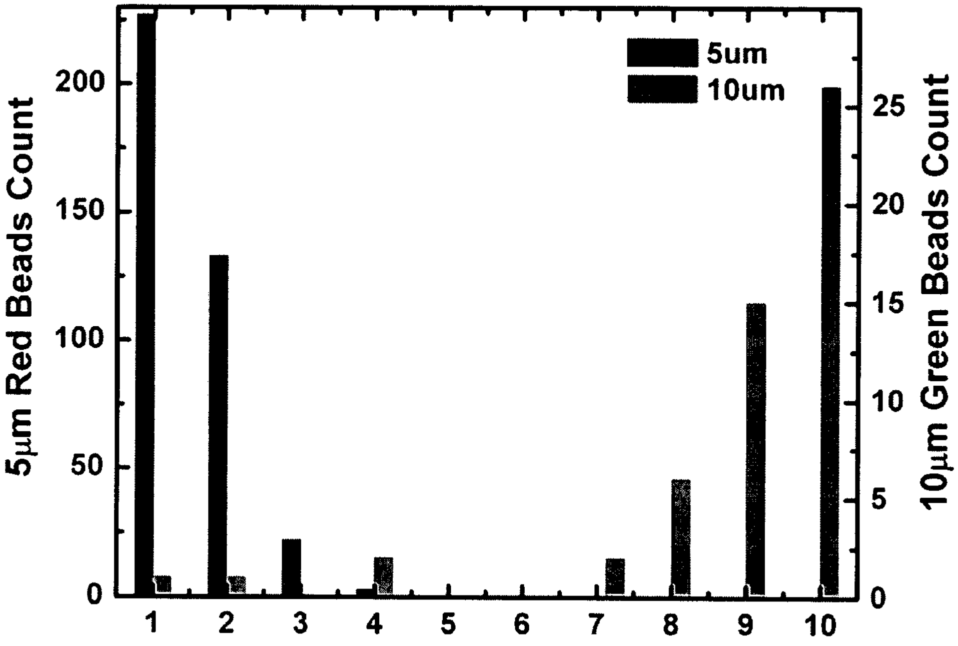
FIG. 7 illustrates the statistics of 5 μm and 10 μm polystyrene beads separation.

FIG. 7 illustrates a statistical distribution of 5 μm and 10 μm polystyrene beads separation. For 5 μm polystyrene beads, approximately 94% of the beads exit from side microchannels 1 and 2, and approximately 63% of the beads exits from side channel 1. Less than 1% of the 10 μm beads are observed entering into channels 1 and 2. Similarly, greater than 96% of 10 μm beads exit from channels 7, 8, 9 and 10, whereas no 5 μm polystyrene beads are detected in channels 7-10. The device of the present invention can achieved efficiency of greater than 90% (such as 91%, 92%, 93%, 94%, 95%, 96%, 97%, 98%).

Figure 8:
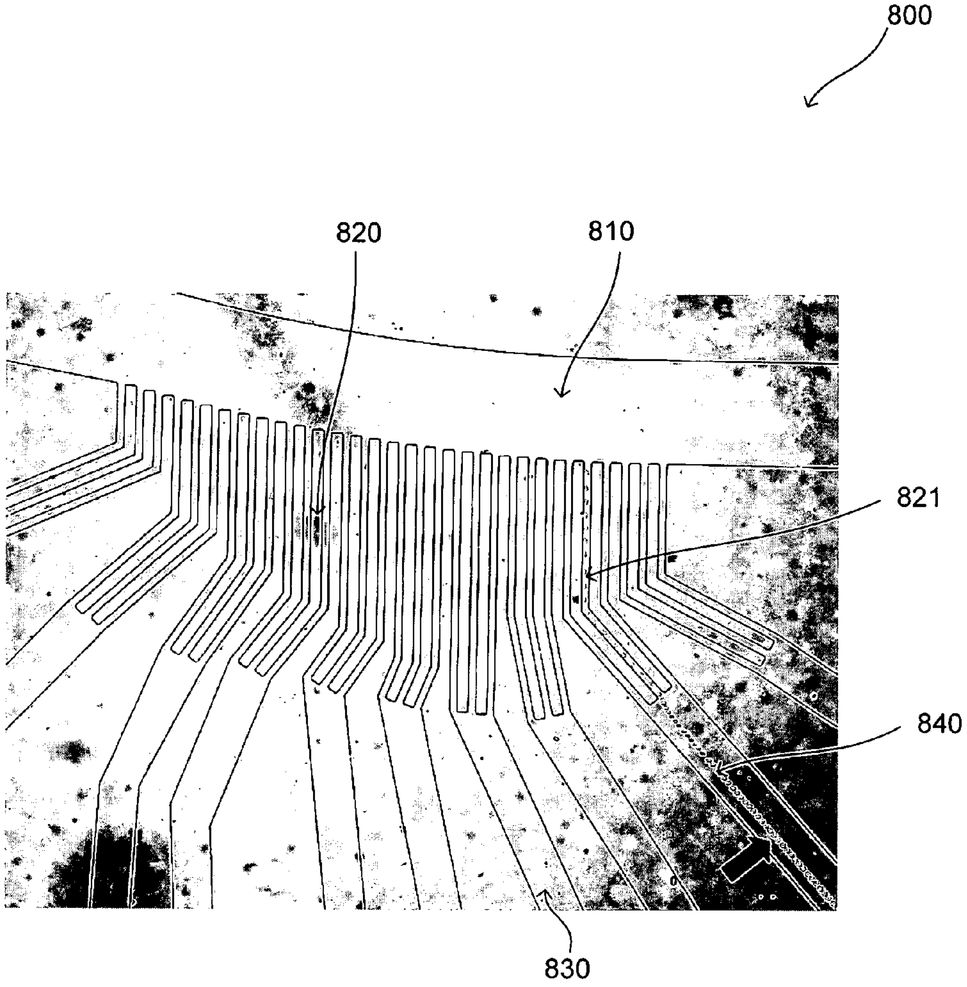
FIG. 8 illustrates the separation of erythrocytes (red blood cells) using an embodiment of the present invention.
Figure 9:
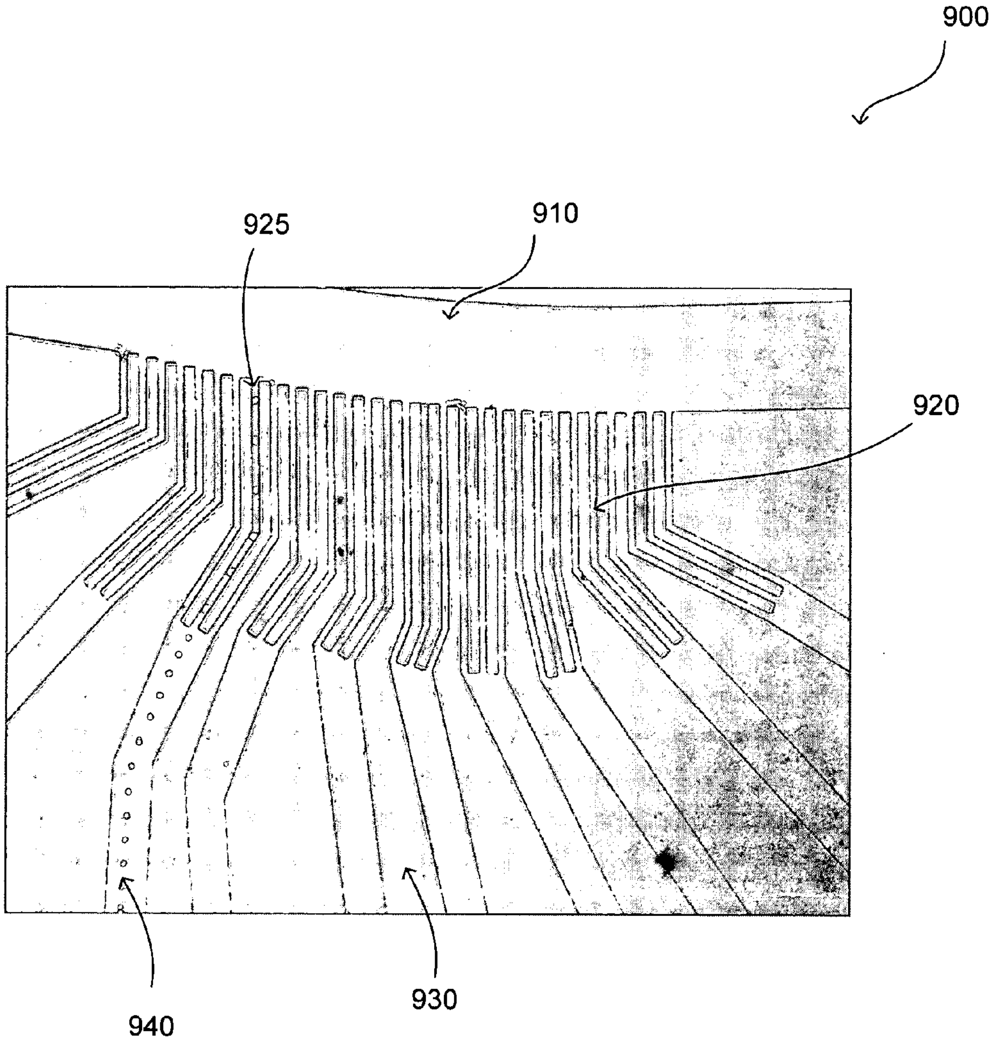
FIG. 9 illustrates the separation of leukocytes (white blood cells) using an embodiment of the present invention. In this instance, the leukocytes are labeled with acridine orange.

The device of the present invention is not limited for the separation of in vitro particles, but can also be used to separate particles in a biological environment, such as cells, fibrins, bacteria, microorganisms, particulates and the like. FIGS. 8 and 9 show images of separation of blood cells using an embodiment of the present invention. In FIG. 8, image 800 illustrates a device having a main microchannel 810 and a number of side microchannels. One representative side microchannel 820 is shown. In one embodiment, three side microchannels of the similar design are grouped together to form an array of grouped side channels. One representative grouped side channel 830 is shown. Alternative grouping designs are also within the scope of the present invention. For example, erythrocytes 840 are separated from leukocytes and exit from a side microchannel 821. Similarly, white blood cells can also be separated using an embodiment of the present invention. Turning to FIG. 9, image 900 illustrates a device having a main microchannel 910 and a number of side microchannels represented by 920. In one embodiment, three side microchannels of the similar design are grouped together to form an array of side channels. One representative grouped side channel 930 is shown. Other grouping designs are also feasible. For example, leukocytes 940 are separated from erythrocytes and exit from a side microchannel 925. The device allows a control on the separation lane width, hence, a possible predictable separation of certain particles on particular side channels. In one embodiment, the device can be adapted for the separation of normal cells and harmful cells. The harmful cells include tumor cells and the like.

Figure 10:
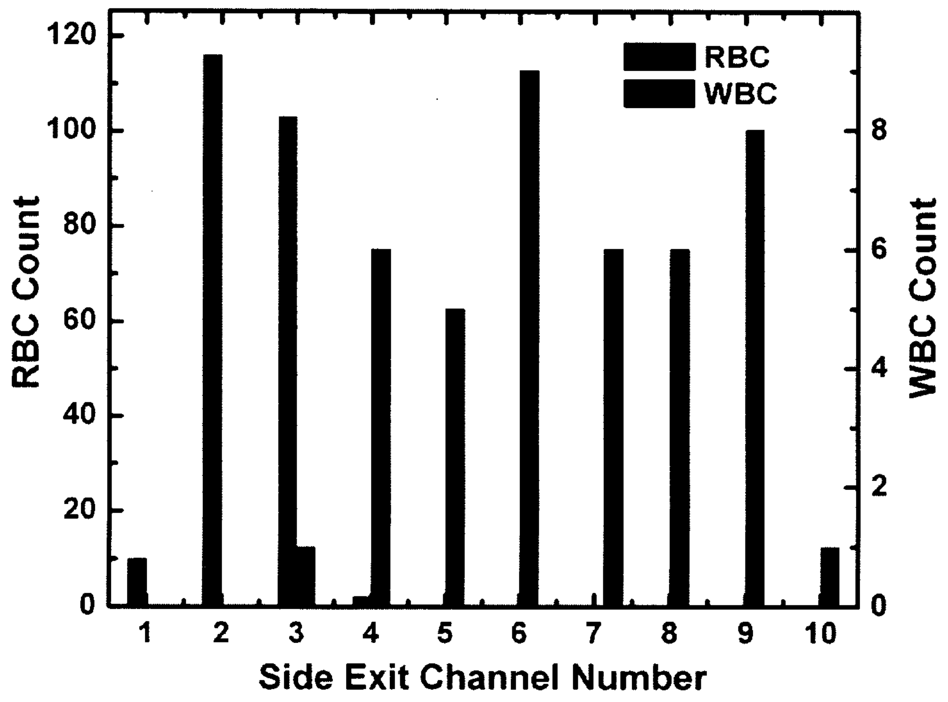
FIG. 10 illustrates the statistics of erythrocytes and leukocytes separation.

FIG. 10 illustrates a statistical distribution of erythrocytes having a size of 5 μm-8 μm and leukocytes having a size of 7 μm-20 μm separation. Over 98% of the red blood cells exits from side microchannels 1, 2 and 3. Over 98% of the white blood cells exits from side channels 4-10. Less than 1% of the erythrocytes are observed to exit in channels 4 and less than 2% of the leukocytes are found to exit from channel 3. The device has achieved an efficiency of greater than 96%.

The present invention also provides a method for streamline separation of particles, The method utilizes the device of the present invention. In one aspect, the method includes contacting the main microchannel with a fluid containing a plurality of particles, optionally applying a positive or a negative pressure to the fluid or the main microchannel, separating each of the particles and collecting each of the separated particles from the side microchannels. The pressure can be applied either directly to the fluid or through a media. The particles to be separated can be synthetic particles, such as polymer beads or particles present in the biological fluid, such as blood cells, cancer cells, bacteria cells, fibrins, particulates and stem cells.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A microfluidic device, said device comprising:

a substrate;

a main microchannel having one inlet and an outlet, said main microchannel is disposed on said substrate;

a plurality of side microchannels, said plurality of side microchannels having a predetermined length, wherein each of said plurality of side microchannels is connected to the main microchannel to form a downstream stagnation point projected into the main microchannel and an upstream edge located at the junction formed between the main microchannel and each of said plurality of side microchannels, wherein said stagnation point has a predetermined geometric design and a predetermined distance (Δλ) of up to 100 μm from the upstream edge; and wherein said main microchannel is in fluid communication with each of said side microchannels;

wherein said side microchannels are divided into a plurality of groups, wherein each group consists of at least two side microchannels;

wherein the predetermined distance of the stagnation points for each group of side microchannels is greater than the predetermined distance of the stagnation points for the immediately preceding group of side microchannels; and wherein the width of the main microchannel remains constant as the predetermined distance increases for each group of side microchannels.

2. The device of claim 1, further comprising a pressure generating means.

3. The device of claim 1, wherein each of said side microchannels is substantially perpendicular to said main microchannel.

4. The device of claim 1, wherein said geometric design comprises a shape, a dimension and a distance.

5. The device of claim 1, wherein said substrate is a material selected from the group consisting of polydimethylsiloxane (PDMS), glass, silicon and a polycarbonate.

6. The device of claim 1, wherein said main microchannel has a cross-section geometry selected from the group consisting of a circle, an oval and a polygonal cross-section.

7. The device of claim 1, wherein the device further comprises a fluid.

8. The device of claim 1, wherein said predetermined distance is up to 9 μm.

9. The device of claim 8, wherein said predetermined distance is from 1 μm-9 μm.

10. The device of claim 1, wherein each of said side microchannel has a length ranging from about 100 μm to about 22000 μm.

11. The device of claim 1, wherein said predetermined distance (Δλ) is up to 20 μm from the upstream edge.

12. The device of claim 1, wherein each group consists of at least three side microchannels.

* * * * *